UNITED STATES PATENT OFFICE.

CARL JOHANN EUGEN DE HAËN, OF LIST, NEAR HANOVER, PRUSSIA, GERMANY.

DOUBLE SULPHATE OF ANTIMONY.

SPECIFICATION forming part of Letters Patent No. 407,925, dated July 30, 1889.

Application filed September 9, 1887. Serial No. 249,259. (Specimens.)

*To all whom it may concern:*

Be it known that I, CARL JOHANN EUGEN DE HAËN, a subject of the King of Prussia, residing at List, near Hanover, in the Kingdom of Prussia, have invented a new and useful Improvement in the Manufacture and Application of a Compound of Fluoride of Antimony with the Sulphate of Ammonia, of which the following is a specification.

The object of the production of this compound is the industrial application of the same in the dyeing art in lieu of the expensive tartar emetic.

The invention consists in the new compound, which is in the nature of a new double salt, and the process of making it by mixing together fluoride of antimony and sulphate of ammonia and then evaporating the mixture.

Fluoride of antimony, the formula of which is $SbFl_3$, (and which is obtained by dissolving pure antimonious oxide, free from iron, in aqueous hydrofluoric acid,) when mixed with a solution of the sulphate of ammonia and the solution is evaporated to the point of crystallization, gives, on cooling, crystals corresponding to the following formula: $SbFl_3 (NH_4)_2SO_4$, which is a double salt of fluoride of antimony and sulphate of ammonia. This compound crystallizes readily and forms crystals of the hexagonal system. It is readily soluble in water at 24° centigrade in the proportion of one part of water to 1.4 part of salt, and at the boiling-point in the proportions of as much as one part of water to fifteen of salt. The salt shows a proportion of antimony in its composition corresponding to 46.94 per cent. of antimonious oxide. This compound forms a perfect substitute for tartar emetic or oxalate of antimony in dyeing, and is much cheaper than either of them.

The mode of applying this double salt of fluoride of antimony and sulphate of ammonia in the dyeing process is exactly the same as that of the tartar emetic.

As in both substances the efficiency depends only on the antimonious oxide, instead of employing, as heretofore, one part of tartar emetic, containing 43.46 per cent. of antimonious oxide, I use about 0.925 part of my compound, containing 46.94 per cent. of antimonious oxide.

Having thus described my invention, what I claim, and desire to secure by Letters Patent, is—

1. The herein-described process of manufacturing the double salt of fluoride of antimony, consisting in mixing fluoride of antimony and sulphate of ammonia and then evaporating the mixture, substantially as specified.

2. As a new article of manufacture, the double salt of fluoride of antimony and sulphate of ammonia having the formula $SbFl_3 (NH_4)_2SO_4$, substantially as described.

In testimony whereof I have signed my name to this specification in the presence of two subscribing witnesses.

CARL JOHANN EUGEN DE HAËN.

Witnesses:
C. LÜTTGE,
JOHS. KRACKE.